US008727637B2

(12) United States Patent
Isenhour et al.

(10) Patent No.: US 8,727,637 B2
(45) Date of Patent: May 20, 2014

(54) FIBER OPTIC INTERFACE DEVICES FOR ELECTRONIC DEVICES

(75) Inventors: Micah C. Isenhour, Lincolnton, NC (US); Dennis M. Knecht, Hickory, NC (US); James P. Luther, Hickory, NC (US)

(73) Assignee: Corning Incorporated, Corning, NY (US)

( * ) Notice: Subject to any disclaimer, the term of this patent is extended or adjusted under 35 U.S.C. 154(b) by 419 days.

(21) Appl. No.: 13/050,747

(22) Filed: Mar. 17, 2011

(65) Prior Publication Data

US 2011/0229090 A1 Sep. 22, 2011

Related U.S. Application Data

(60) Provisional application No. 61/315,417, filed on Mar. 19, 2010.

(51) Int. Cl.
*G02B 6/36* (2006.01)

(52) U.S. Cl.
USPC .................................. 385/78; 385/70; 385/72

(58) Field of Classification Search
CPC .... G02B 6/387; G02B 6/3879; G02B 6/3806; G02B 6/3807; G02B 6/3869; G02B 6/3885; G02B 6/3821; G02B 6/3847; G02B 6/381; G02B 6/3851; G02B 6/385
USPC ................................. 385/78, 70, 72
See application file for complete search history.

(56) References Cited

U.S. PATENT DOCUMENTS

| 4,213,677 | A | | 7/1980 | Sugimoto et al. .......... 350/96.18 |
|---|---|---|---|---|
| 4,268,112 | A | | 5/1981 | Peterson .................... 350/96.18 |
| 4,682,848 | A | * | 7/1987 | Cairns et al. ................... 385/69 |
| 4,701,011 | A | | 10/1987 | Emkey et al. .............. 350/96.18 |
| 5,104,242 | A | * | 4/1992 | Ishikawa ........................ 385/53 |
| 5,172,271 | A | | 12/1992 | Sinclair ........................ 359/652 |
| 5,333,225 | A | * | 7/1994 | Jacobowitz et al. ............ 385/93 |
| 5,337,388 | A | * | 8/1994 | Jacobowitz et al. ........... 385/76 |
| 5,384,874 | A | | 1/1995 | Hirai et al. ...................... 385/34 |
| 5,784,512 | A | | 7/1998 | Hensen ........................... 385/61 |
| 5,832,153 | A | | 11/1998 | Duck ............................. 385/34 |
| 5,850,493 | A | | 12/1998 | Cheng ........................... 385/34 |

(Continued)

FOREIGN PATENT DOCUMENTS

| AU | 199898138 B2 | 8/1999 | .............. G02B 6/32 |
|---|---|---|---|
| JP | 63-293510 | 11/1988 | .............. G02B 6/42 |
| WO | WO01/11409 A2 | 2/2001 | .............. G02B 23/24 |
| WO | WO03/076993 A1 | 9/2003 | .............. G02B 6/32 |

OTHER PUBLICATIONS

Patent Cooperation Treaty, International Search Report and Written Opinion, May 24, 2011, 8 pgs.

(Continued)

*Primary Examiner* — Kaveh Kianni

(57) ABSTRACT

Fiber optic interface devices (20, 320) for electronic devices (300) are disclosed. A plug-type fiber optic interface (20) has an axially moveable multi-fiber ferrule (100) that supports optical fibers (52) or a combination of optical fibers and gradient-index lenses (600). A resilient member (150) serves to provide the ferrule with forward-bias and rear-bias positions relative to a recessed front end (22) of a housing (21). A fiber optic interface assembly (570) that includes mated plug and receptacle fiber optic interface devices (20, 320) is also disclosed.

8 Claims, 11 Drawing Sheets

(56) References Cited

U.S. PATENT DOCUMENTS

| | | | |
|---|---|---|---|
| 5,923,802 A | 7/1999 | Giebel et al. .................... 385/76 |
| 6,012,852 A | 1/2000 | Kadar-Kallen et al. ......... 385/74 |
| 6,033,125 A | 3/2000 | Stillie et al. .................... 385/75 |
| 6,157,485 A | 12/2000 | Cheng .......................... 359/495 |
| 6,246,026 B1 | 6/2001 | Vergeest ................... 219/121.72 |
| 6,542,665 B2 | 4/2003 | Reed et al. ...................... 385/34 |
| 6,632,025 B2 | 10/2003 | Ukrainczyk .................... 385/70 |
| 6,655,850 B2 | 12/2003 | Mann et al. ..................... 385/74 |
| 6,687,434 B2 | 2/2004 | Ishikawa ......................... 385/34 |
| 6,736,547 B2 | 5/2004 | Stevens et al. ................. 385/61 |
| 6,837,625 B2 | 1/2005 | Schott et al. .................... 385/60 |
| 6,899,464 B2 | 5/2005 | Stevens et al. ................. 385/53 |
| 6,963,687 B2 | 11/2005 | Vergeest et al. .............. 385/123 |
| 7,077,576 B2 | 7/2006 | Luther et al. ................... 385/59 |
| 7,104,701 B1 | 9/2006 | Durrant et al. .................. 385/74 |
| 7,153,036 B2 * | 12/2006 | Healy et al. .................... 385/78 |
| 7,180,600 B2 * | 2/2007 | Horii et al. .................... 356/479 |
| 7,329,050 B1 | 2/2008 | Dugan et al. .................... 385/55 |
| 7,346,236 B2 | 3/2008 | Asano et al. .................... 385/34 |
| 7,346,237 B2 | 3/2008 | Matsumura et al. ............ 385/34 |
| 7,357,005 B2 | 4/2008 | Matsumura et al. ............ 65/387 |
| 7,460,750 B2 | 12/2008 | Durrant et al. .................. 385/74 |
| 7,572,071 B1 | 8/2009 | Wu ................................. 385/94 |
| 7,603,008 B2 | 10/2009 | Matsumura et al. ............ 385/35 |
| 7,775,725 B2 | 8/2010 | Grinderslev .................... 385/74 |
| 2002/0146211 A1 | 10/2002 | Stevens et al. ................. 385/61 |
| 2003/0012513 A1 | 1/2003 | Ukrainczyk .................... 385/61 |
| 2003/0021543 A1 | 1/2003 | Mann et al. ..................... 385/74 |
| 2004/0009697 A1 | 1/2004 | Clark et al. .................... 439/362 |
| 2004/0175073 A1 * | 9/2004 | Grinderslev et al. ........... 385/34 |
| 2005/0136722 A1 | 6/2005 | Cairns ........................... 439/271 |
| 2006/0222299 A1 | 10/2006 | Durrant et al. .................. 385/74 |
| 2006/0239619 A1 * | 10/2006 | Luther et al. ................... 385/69 |
| 2007/0025665 A1 | 2/2007 | Dean et al. ..................... 385/78 |
| 2008/0050072 A1 | 2/2008 | Durrant et al. .................. 385/74 |
| 2008/0279509 A1 | 11/2008 | Durrant et al. .................. 385/72 |
| 2009/0041412 A1 | 2/2009 | Danley et al. ................... 385/85 |
| 2009/0297099 A1 | 12/2009 | Benjamin et al. ............... 385/32 |
| 2009/0324175 A1 | 12/2009 | Everett et al. ................... 385/72 |
| 2009/0324176 A1 | 12/2009 | Cheng et al. .................... 385/73 |
| 2010/0027943 A1 * | 2/2010 | Armani et al. .................. 385/74 |
| 2010/0104244 A1 * | 4/2010 | Grinderslev .................... 385/74 |
| 2010/0215325 A1 | 8/2010 | Tamura et al. .................. 385/89 |
| 2012/0099822 A1 | 4/2012 | Kuffel et al. .................... 385/78 |
| 2012/0195556 A1 * | 8/2012 | Wang et al. ..................... 385/77 |

OTHER PUBLICATIONS

W. J. Tomlinson, "Applications of GRIN-rod lenses in optical fiber communications systems," Applied Optics, Apr. 1, 1980, vol. 19, No. 7, pp. 1127-1138.

Emkey, et al., "Analysis and Evaluation of Graded-Index Fiber-Lenses," Journal of Lightwave Technology, vol. LT-5, No. 9, Sep. 1987, pp. 1156-1164.

Palais, Joseph C, "Fiber coupling using graded-index rod lenses," Applied Optics, Jun. 15, 1980, vol. 19, No. 12, pp. 2011-2018.

http://www.cvimellesgroit.com, "Gradient-Index Lenses".

Chanclou, et al., "Design and demonstration of a multicore single-mode fiber coupled lens device," Optics Communications 233, 2004, pp. 333-339.

Senior, et al., "Misalignment losses at multimode graded-index fiber splices and GRIN rod lens couplers," Applied Optics, Apr. 1, 1985, vol. 24, No. 7, pp. 977-983.

Gilsdorf, et al., "Single-mode fiber coupling efficiency with graded-index rod lenses," Applied Optics, Jun. 1, 1994, vol. 33, No. 16, pp. 3440-3445.

Cusworth, et al., "Angular tilt misalignment loss at a GRIN rod lens coupler," Applied Optics, Jun. 1, 1986, vol. 25, No. 11, pp. 1775-1779.

\* cited by examiner

FIBER OPTIC INTERFACE DEVICES FOR ELECTRONIC DEVICES

CLAIM OF PRIORITY

This application claims the benefit of priority under 35 U.S.C. §119(e) of U.S. Provisional Application Ser. No. 61/315,417, filed on Mar. 19, 2010.

FIELD

The present disclosure relates generally to fiber optic interface devices, and in particular relates to multi-fiber fiber optic interface devices for use with electronic devices.

BACKGROUND

Optical fiber is increasingly being used for a variety of applications, including but not limited to broadband voice, video, and data transmission. As consumer devices are steadily using more bandwidth, interface devices for these devices will likely move away from electrical connections and toward using optical connections for increased bandwidth. Generally speaking, conventional fiber optic interface devices used for telecommunication networks and the like are not suitable for consumer electronic devices.

For instance, conventional fiber optic interface devices are relatively large compared with the consumer electronic devices and their interfaces. Additionally, conventional fiber optic interface devices are deployed with great care into relatively clean environments and/or cleaned by the craft before connecting to the device interface. Further, even though fiber optic interface devices are reconfigurable (i.e., suitable for mating/unmating), they are not intended for a relatively large number of mating cycles. Instead, conventional fiber optic interface devices are high-precision interface devices designed for reducing insertion loss between mating interface devices in the optical network.

On the other hand, the consumer electronic devices are expected to have a relatively large number of mating/unmating cycles during ordinary operation. The consumer electronic devices will be operated in a multitude of environments where dirt, dust, and other debris is encountered on a regular basis. Further, consumer electronic devices typically have size and space constraints for making connections. Consequently, there is an unresolved need for fiber optic interface devices suitable for consumer electronic devices.

SUMMARY

An aspect of the disclosure is a fiber optic interface device for connecting at least one optical fiber of an optical fiber cable. The fiber optic interface device includes a housing having a central axis, a front end, and an interior having a ferrule guide member disposed therein and attached to the housing. The fiber optic interface device also includes a ferrule having a central axis, and front and rear ends. The ferrule is configured to support the at least one optical fiber having an optical fiber end substantially at the ferrule front end. The ferrule is moveably supported by the ferrule guide member, with the ferrule axis being aligned with (e.g., coaxial with) the housing central axis. A resilient member is disposed within the housing interior and is operatively arranged therein to forward-bias the ferrule toward the housing front end when the fiber optic interface device is not mated (i.e., is not interfaced) with another fiber optic interface device.

Another aspect of the disclosure is a fiber optic interface assembly that includes the fiber optic interface device as described immediately above, and a receptacle matingly engaged with the fiber optic interface device. The receptacle acts to place the fiber optic interface device in a rear-biased position wherein the ferrule axially moves relative to a recessed front end of the housing.

Another aspect of the disclosure is a fiber optic interface device for connecting transmit and receive optical fibers having respective ends. The device includes a housing having a central axis, a front end, an exterior surface and an interior having a ferrule guide member disposed therein and attached to the housing (e.g., fixed thereto). The device also includes a ferrule having a central axis, and front and rear ends. The ferrule is configured to support the transmit and receive optical fibers and respective transmit and receive gradient-index (GRIN) lens elements having front and rear surfaces. The transmit and receive optical fiber ends are arranged adjacent respective transmit and receive GRIN lens rear surfaces while the transmit and receive GRIN lens front surfaces are arranged at or adjacent the ferrule front end. The ferrule is moveably supported by the ferrule guide member so that the ferrule can move axially, with the ferrule axis being aligned with (e.g., coaxial with) the housing central axis. The device also includes a resilient member disposed within the housing interior and configured to forward-bias the ferrule toward the housing front end when the fiber optic interface device is unmated.

Another aspect of the disclosure is a fiber optic interface assembly that includes the fiber optic interface device as described immediately above, and a receptacle matingly engaged with the fiber optic interface device. The receptacle acts to place the fiber optic interface device in a rear-biased position wherein the ferrule axially moves relative to a recessed front end of the housing.

It is to be understood that both the foregoing general description and the following detailed description present embodiments of the disclosure, and are intended to provide an overview or framework for understanding the nature and character of the disclosure as it is claimed. The accompanying drawings are included to provide a further understanding of the disclosure, and are incorporated into and constitute part of this specification. The drawings illustrate various exemplary embodiments of the disclosure, and together with the description serve to explain the principles and operations of the disclosure.

DETAILED DESCRIPTION

Figure 1:
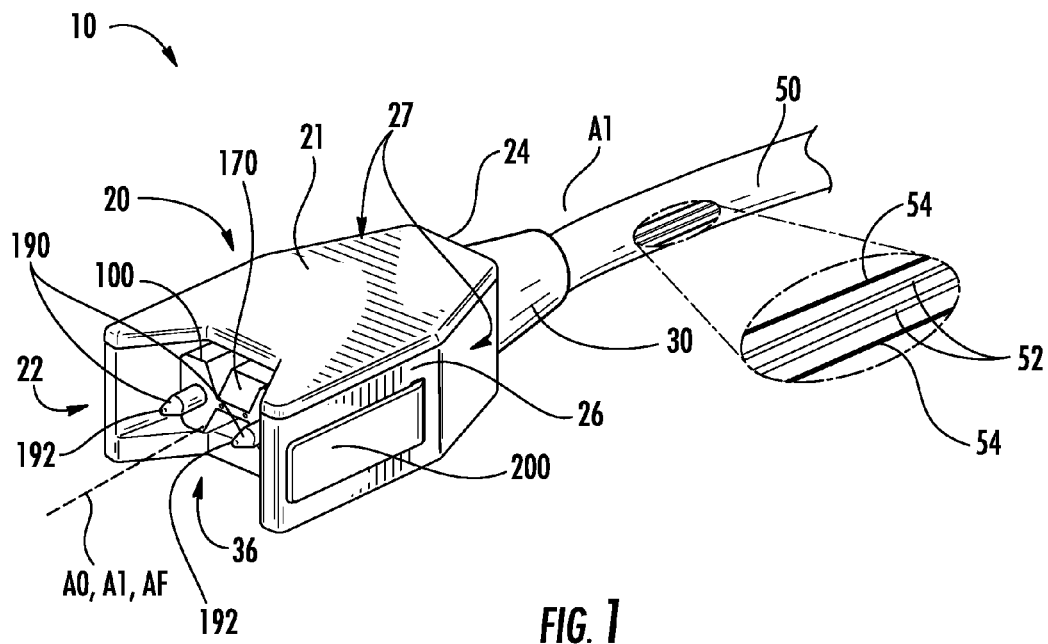
FIG. 1 and FIG. 2 are front elevated views of an example fiber optic cable assembly that employs an example fiber optic interface device in the form of a plug.

Reference is now made in detail to the present preferred embodiments of the disclosure, examples of which are illustrated in the accompanying drawings. Whenever possible, like or similar reference numerals are used throughout the drawings to refer to like or similar parts. Various modifications and alterations may be made to the following examples within the scope of the present disclosure, and aspects of the different examples may be mixed in different ways to achieve yet further examples. Accordingly, the true scope of the disclosure is to be understood from the entirety of the present disclosure, in view of but not limited to the embodiments described herein.

In some of the Figures, Cartesian coordinates are shown for reference. Also, the terms "plug" and "receptacle" are used for the sake of distinguishing different parts of a fiber optic interface device assembly that includes two fiber optic interface devices having complementary geometries. Further, in some of the examples discussed below, the receptacle is part of an electronic device, and a plug is used to plug into the receptacle of the electronic device.

In the discussion below, the term "electronic device" means a device that has either electronic or optical and electronic components and functionality, including a receptacle and associated hardware configured to receive, transmit or both transmit and receive optical signals and also communicate electrical power.

Figure 2:
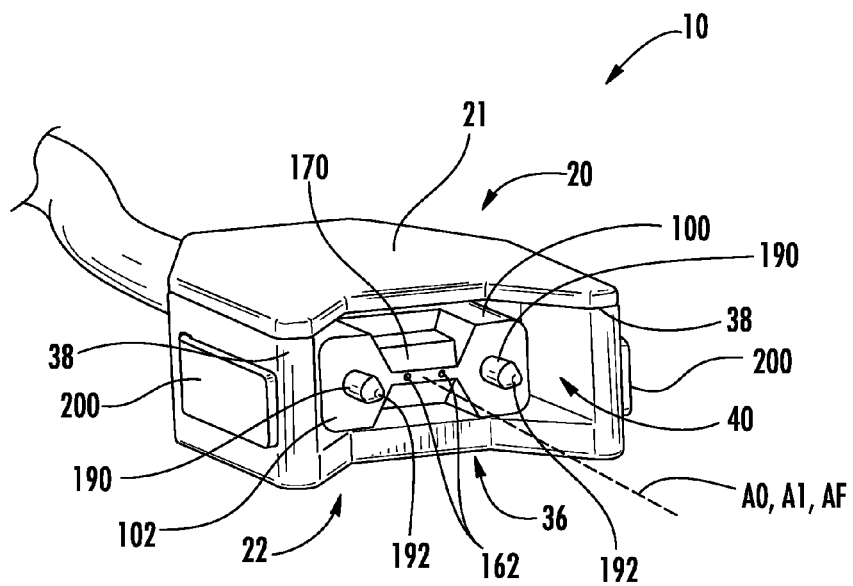
Figure 3:
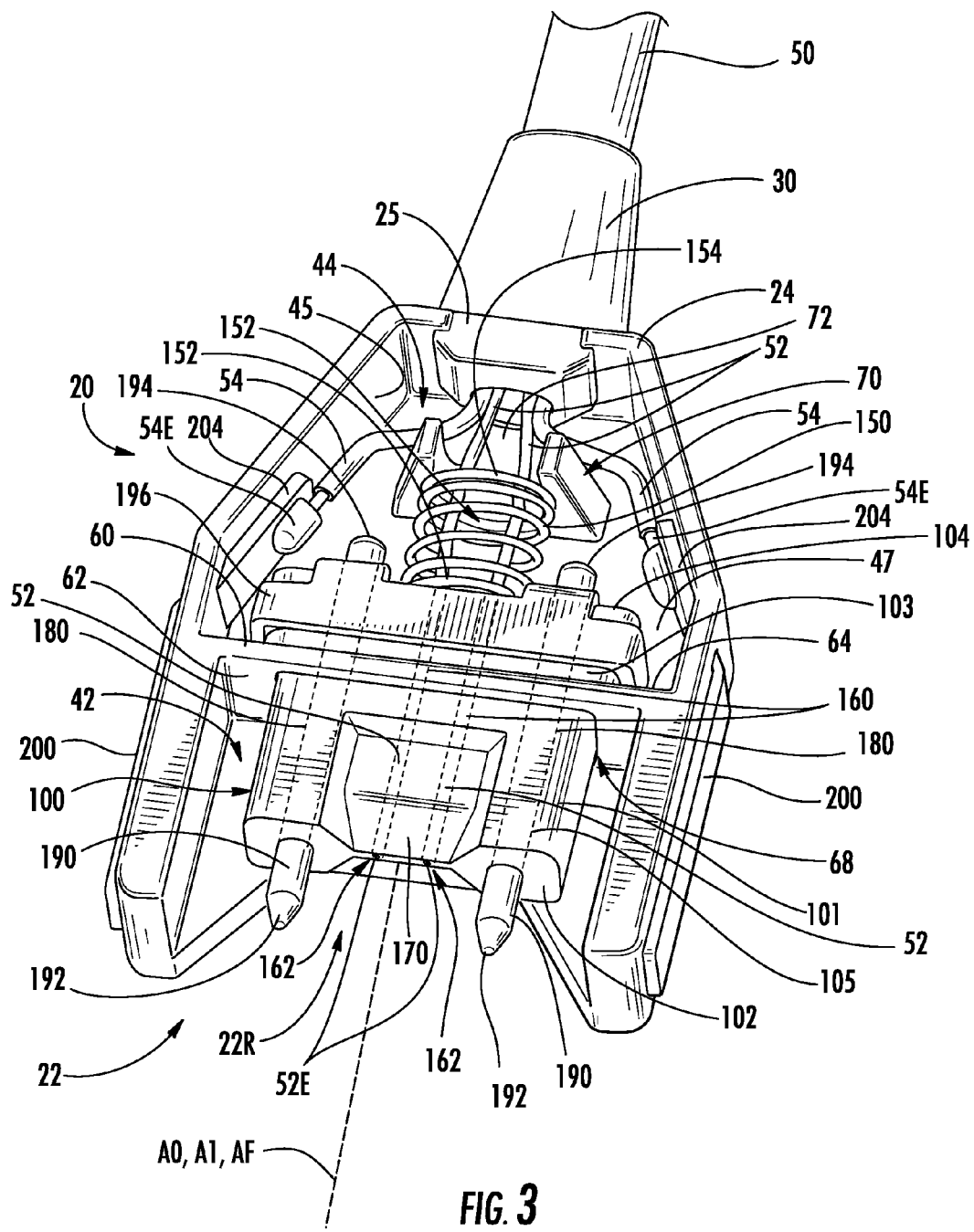
FIG. 3 and FIG. 4 are front and rear elevated cut-away views that illustrate details of the interior configuration of the plug of FIG. 1 and FIG. 2, with FIG. 4 illustrating laser processing of the optical fibers using a laser beam.
Figure 4:
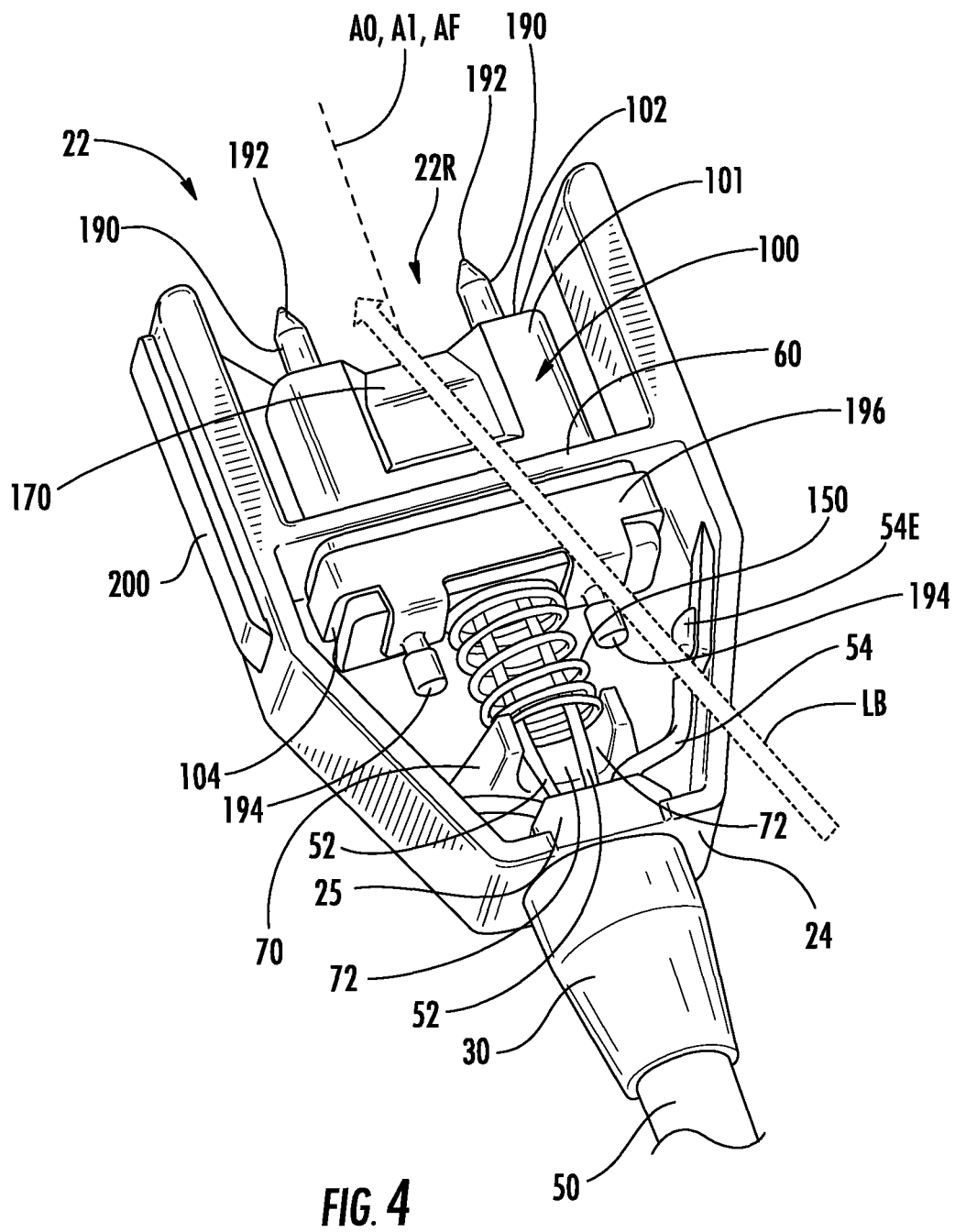

FIG. 1 and FIG. 2 are front elevated views of an example fiber optic cable assembly 10 that includes a fiber optic interface device 20 operably connected to a fiber optic cable 50. In an example, fiber optic cable 50 carries at least one optical fiber 52, e.g., two optical fibers, with one being a transmit fiber and one being a receive fiber for respectively carrying transmit and receive optical signals. Also in an example embodiment, fiber optical cable 50 carries at least one electrical wire 54, e.g., two electrical wires ("black and red") that can carry electrical power. In the example, where fiber optic cable 50 carries both at least one optical fiber 52 and at least one electrical wire 54, fiber optic interface device 20 can be thought of as a hybrid electrical-optical (O-E) interface device. FIG. 3 and FIG. 4 are front and rear elevated cut-away views that illustrate details of the interior configuration of fiber optic interface device 20.

As fiber optic interface device 20 is configured to plug into a complementary fiber optic interface device, it is referred to hereinafter as plug 20, and the complementary fiber optic interface device introduced and discussed below is referred to as receptacle 320.

With reference to FIG. 1 through FIG. 4, plug 20 includes a housing 21 with a central axis A0, a front end 22, a rear end 24 and sides 26 that constitute part of housing exterior surface 27. Rear end 24 includes an opening 25. A strain-relief member 30 is arranged at rear end 24 of housing 21 at opening 25 and serves to reduce the amount of strain on fiber optic cable 50 where the fiber optic cable connects to the housing. Plug 20 includes a central axis A1 that is co-axial with housing central axis A0.

Front end 22 of plug housing 21 includes a recess 36 that defines housing side extensions or prongs 38 that serve to provide alignment with a complementary receptacle 320 (introduced and discussed below in connection with FIG. 6 and FIGS. 7A and 7B), to which plug 20 is configured to matingly engage. Recess 36 thus defines a recessed front end 22R of housing 21 within recess 36.

Housing 21 defines an interior 40 that includes a front section 42 open at housing front end 22 and a rear section 44 (see FIGS. 3 and 4). Front and rear interior sections 42 and 44 are generally defined by an internal wall 60 having front and rear surface 62 and 64, and a central aperture 68 open to the front and rear interior sections. Rear interior section 44 includes interior sidewalls 45 and a floor 47. Rear interior section 44 also includes a retention feature 70 disposed between interior wall 60 and housing rear end 24. Retention feature 70 is connected to floor 47 of rear interior section 44 and includes a central aperture 72 sized to pass optical fibers 52 that pass into rear interior section 44 of housing 21 through the housing rear-end opening 25.

Plug 20 also includes a ferrule 100 arranged in housing interior 40. In an example, ferrule 100 has an MT configuration. Ferrule 100 includes a front section 101 having a front end 102, and a rear section 103 having a rear end 104. Ferrule 100 also includes a top 105. Ferrule 100 is arranged in housing interior 40 and within central aperture 68 of internal wall 60 so that ferrule front section 101 resides within front interior section 42 and ferrule rear section 103 resides within rear interior section 44. Ferrule 100 has a central axis AF that is aligned with plug axis A1 when the plug ferrule is arranged in housing interior 40; for example, the alignment can be essentially coaxial alignment, or it can be slightly offset alignment.

The ferrule front and rear sections 101 and 103 are defined by a step 110, with the rear section being wider than the front section. Ferrule 100 is loosely held within wall aperture 68 so that it can move axially within plug housing 21. Ferrule step 110 engages the rear surface 64 of internal wall 60 to limit the forward movement of the ferrule 100. In this sense, internal wall 60 serves as an example of a ferrule guide member configured to allow ferrule 100 to move axially within housing 21. Other configurations for a ferrule guide member beyond the example of an internal wall 60 and aperture 68 can also be employed; for example, the wall can be attached to plug 20 by being monolithically formed to it, or wall 60 can be attached by sliding the wall into grooves, slots, latches, recesses, snap fit structure, or other suitable attachment attributes. Thus, in an example, a ferrule guide member is disposed within housing interior 40 and is attached (e.g., fixedly attached) to the housing.

Plug 20 further includes a resilient member 150 having a front end 152 and a rear end 154. In an example, resilient member 150 is operatively arranged within housing interior rear section 44 with the resilient member front end 152 at ferrule rear end 104 and the resilient member rear end 154 at retention feature 70. Resilient member 150 has a spring force that serves to urge ferrule 100 to a forward-bias position when plug 20 is not engaged with a receptacle or is not otherwise intentionally being urged rearward. The forward-bias position is defined by the aforementioned ferrule step 110 contacting internal wall rear surface 64, and places ferrule front end 102 substantially at recessed front end 22R of plug housing 21.

Resilient member 150 is also configured to compress to allow for ferrule 100 to move axially rearward within plug housing 21 when the plug engages a receptacle or is otherwise urged rearward in the housing. In an example embodiment, resilient member 150 is a spring with an interior 156, and optical fibers 52 travel through the spring interior to ferrule 100. In an alternate example, retention feature 70 is not employed and one end of resilient member 150 resides against housing rear end 24 within rear interior section 44.

Ferrule 100 further includes waveguide bores 160 that extend from ferrule rear end 104 to ferrule front end 102 where the bores terminate at bore ends 162. In one example, bores 160 are sized to support optical waveguides, e.g., optical fibers 52. In an example, ferrule 100 includes two waveguide bores 160 configured to respectively accommodate two optical fibers 52, which can be transmit and receive optical fibers. Optical fibers 52 have optical fiber ends 52E that in one example terminate substantially at waveguide bore ends 162, i.e., directly at the waveguide bore ends, or slightly extending from the waveguide bore ends, or slightly recessed in the waveguide bore ends. Optical fibers 52 are provided with some slack within rear interior section 44 of housing interior 40 to accommodate the axial movement of ferrule 100.

Ferrule 100 also includes an angled portion 170 adjacent ferrule front end 102 and ferrule top surface 105. Angled portion 170 facilitates laser processing of optical fibers 52 using a laser beam LB to form optical fiber ends 52E at or near bore ends 162, as schematically illustrated in FIG. 4.

In an example, ferrule 100 additionally includes two guide-pin bores 180 on respective sides of waveguide bores 160 and that lie in a common plane with ferrule central axis AF. Guide-pin bores 180 accommodate respective guide pins 190 that have respective front ends 192 and rear ends 194. In an example, a guide-pin retention member 196 is arranged over ferrule rear section 103 and is fixed to guide pins 190 at or near guide-pin rear ends 194. Guide-pin retention member 196 serves to secure guide pins 190 to ferrule 100. In an example embodiment, guide pins 190 are metallic and serve as conducting members by being electrically connected at guide-pin rear ends 194 to electrical wire ends 54E.

In an alternate example embodiment, guide pins 190 are formed integral with ferrule 100.

Plug 20 also includes two plug electrical contacts 200 disposed on respective sides 26 of plug housing 21. Plug electrical contacts 200 have respective rear portions that extend onto sidewalls 45 of rear section 44 of housing interior 40. The two electrical wires 54 supported by fiber optic cable 50 and that have end portions 54E that reside in housing rear section 44 are electrically contacted to electrical contacts 200 at respective rear portions 204 of the plug electrical contacts 200.

Figure 5:
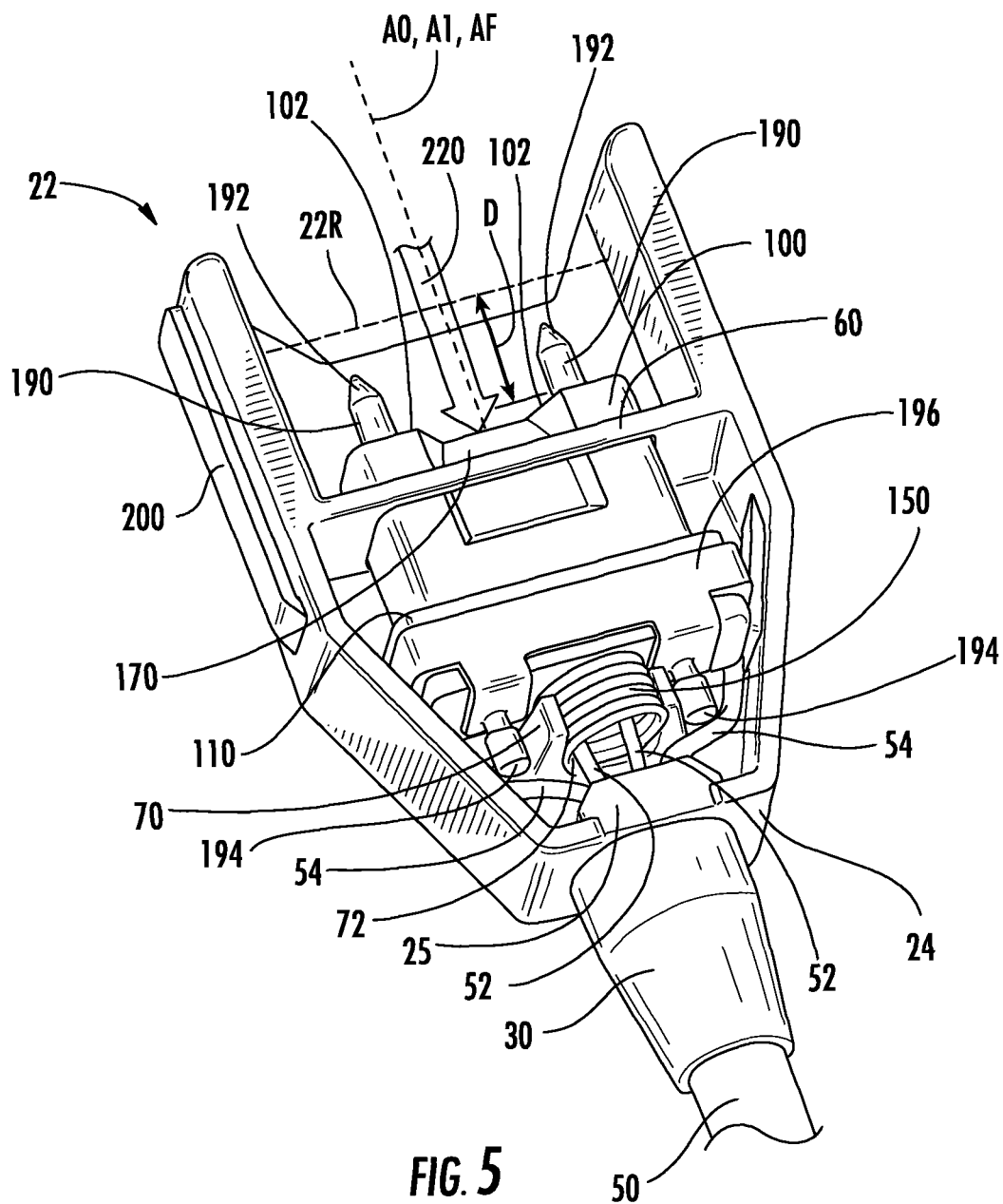
FIG. 5 is similar to FIG. 4, but shows the plug ferrule in the rear-biased position due to an urging force on the plug ferrule in the axial direction and toward the rear end of the plug housing.

FIG. 5 is similar to FIG. 4, but shows ferrule 100 in a rear-biased position when subjected to an urging force illustrated by arrow 220. Note that ferrule front end 102 has moved a distance D from its original forward-biased position to its rear-biased position. In example embodiments, distance D is in the range from 0.5 mm to 10 mm, more preferably in the range from 2 mm to 8 mm and even more preferably in the range from 5 mm to 7 mm. The forward-bias position is advantageous because it presents ferrule front end 102 substantially at recessed front end 22R of housing 21, and this allows for easy access to the ferrule front surface for cleaning the ferrule. This is important in applications where plug 20 is used to connect to commercial electronic devices, such as electronic device 300 introduced and discussed below, because contamination due to debris, liquids, etc., is anticipated to be a significant issue in establishing a proper electrical and optical connection.

Figure 6:
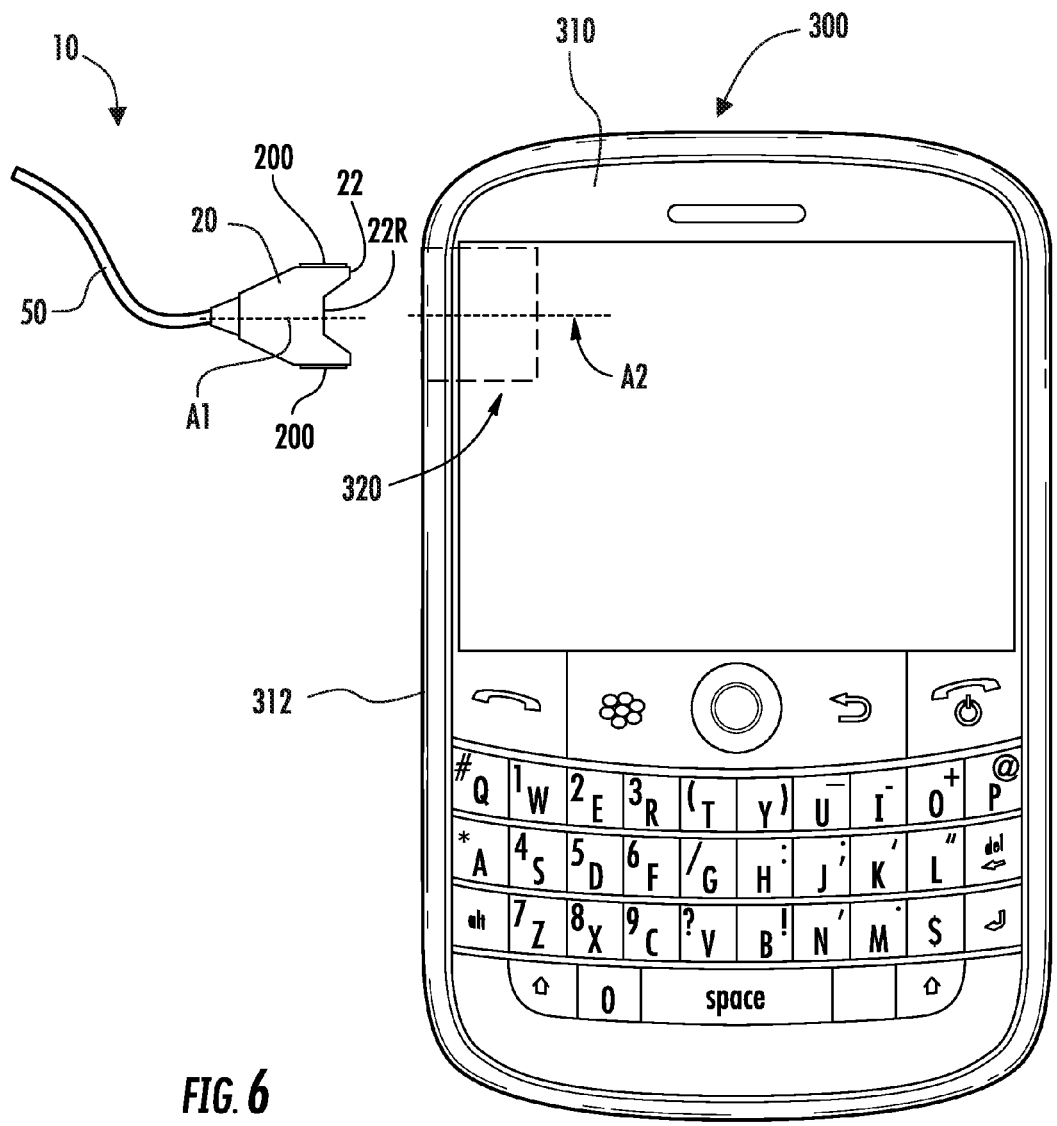
FIG. 6 is a top-down view of an example electronic device and the fiber optic cable assembly next to the electronic device.

FIG. 6 is a top-down view of an example electronic device 300 and fiber optic cable assembly 10 next to the electronic device. Electronic device 300 has a housing 310 with a side 312. Electronic device housing 310 supports the aforementioned receptacle 320 at housing side 312. Receptacle 320 is a fiber optic interface device having a complementary geometry to plug 20 and is thus configured to matingly engage with plug 20.

Figure 7A:
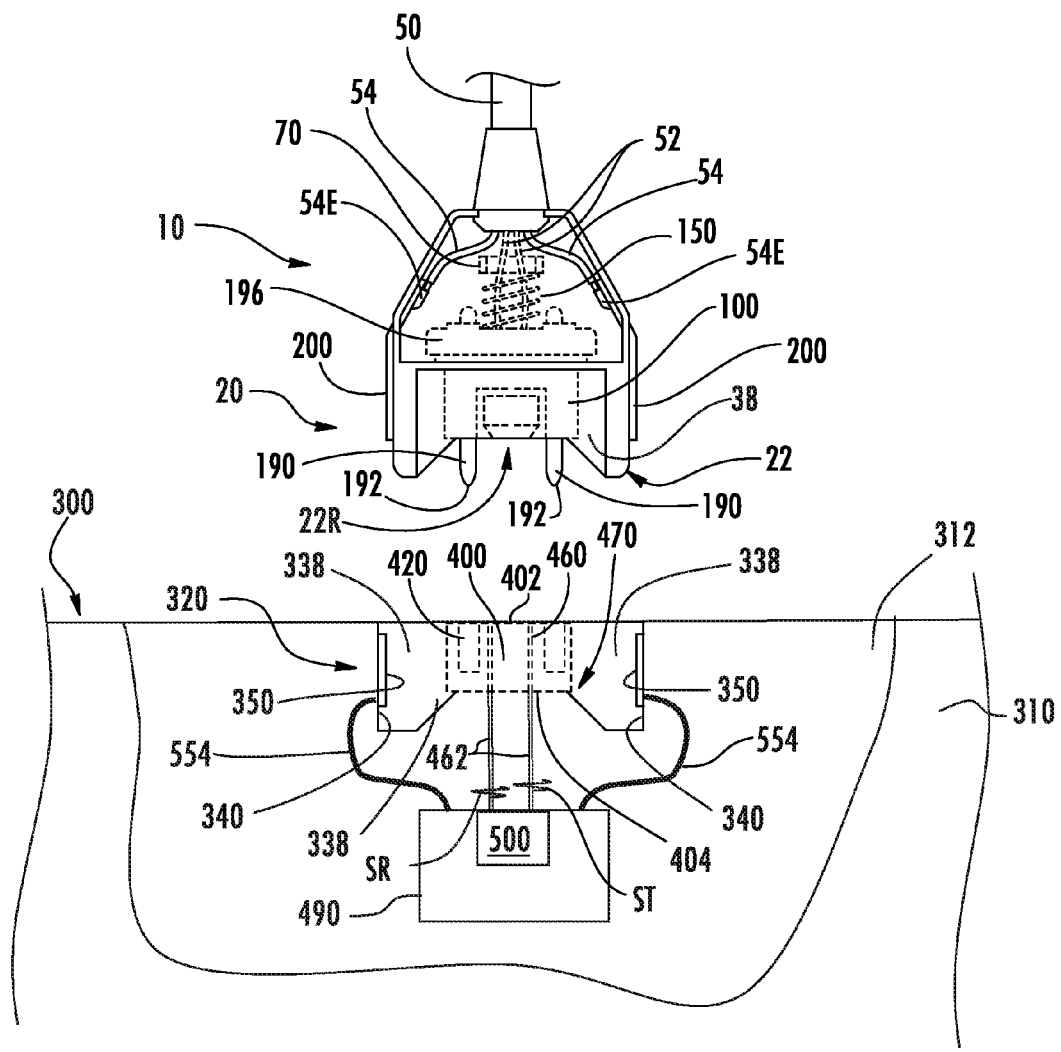
FIG. 7A is a close-up, top-down cut-away view of the plug adjacent the receptacle of the electronic device just prior to engaging the plug and receptacle.

FIG. 7A is a close-up view of plug 20 shown adjacent receptacle 320 prior to connecting fiber optic cable assembly 10 to electronic device 300. Note that ferrule 100 of plug 20 is in its forward-biased position in plug housing 21, with ferrule front end 102 substantially at recessed front end 22R of plug housing 21.

Receptacle 320 has a central axis A2 and generally has a complementary geometry to plug 20. In an example, receptacle 320 includes recess features 338 complementary to prongs 38 so that the prongs and recess features can engage and serve as an alignment guide when mating plug 20 to receptacle 320.

Receptacle 320 has first and second outer walls 340 that partially define recess features 338. Receptacle 320 further includes first and second receptacle electrical contacts 350 respectively disposed on the first and second outer walls 340. These first and second receptacle electrical contacts 350 come into contact with plug electrical contacts 200 of plug 20 when plug 20 is matingly engaged with receptacle 320.

Receptacle 320 also includes a receptacle ferrule 400 having a front end 402 and a rear end 404. Receptacle ferrule 400 includes guide-pin holes 420 formed in receptacle ferrule front end 402 and sized to receive guide-pin front ends 192.

Receptacle ferule 400 also includes optical waveguide bores 460 that operably support receptacle optical waveguides 462, such as receptacle optical fibers. Receptacle ferrule 400 is supported on a pedestal 470 defined by recess features 338, with receptacle front end 402 residing near electronic device housing side 312. Receptacle ferrule 400 is fixed in place, i.e., it is not configured to move.

In an example, receptacle 320 includes circuit board 490 that operably supports an integrated optical engine 500 configured to transmit and receive optical signals ST and SR, and also to provide electrical power via receptacle electrical wires 554. Receptacle 320 is optically connected to integrated optical engine 500 via receptacle optical waveguides 462. Receptacle 320 is also electrically connected to circuit board 490 via receptacle electrical wires 554 that are electrically connected to the receptacle electrical contacts 350.

Figure 7B:
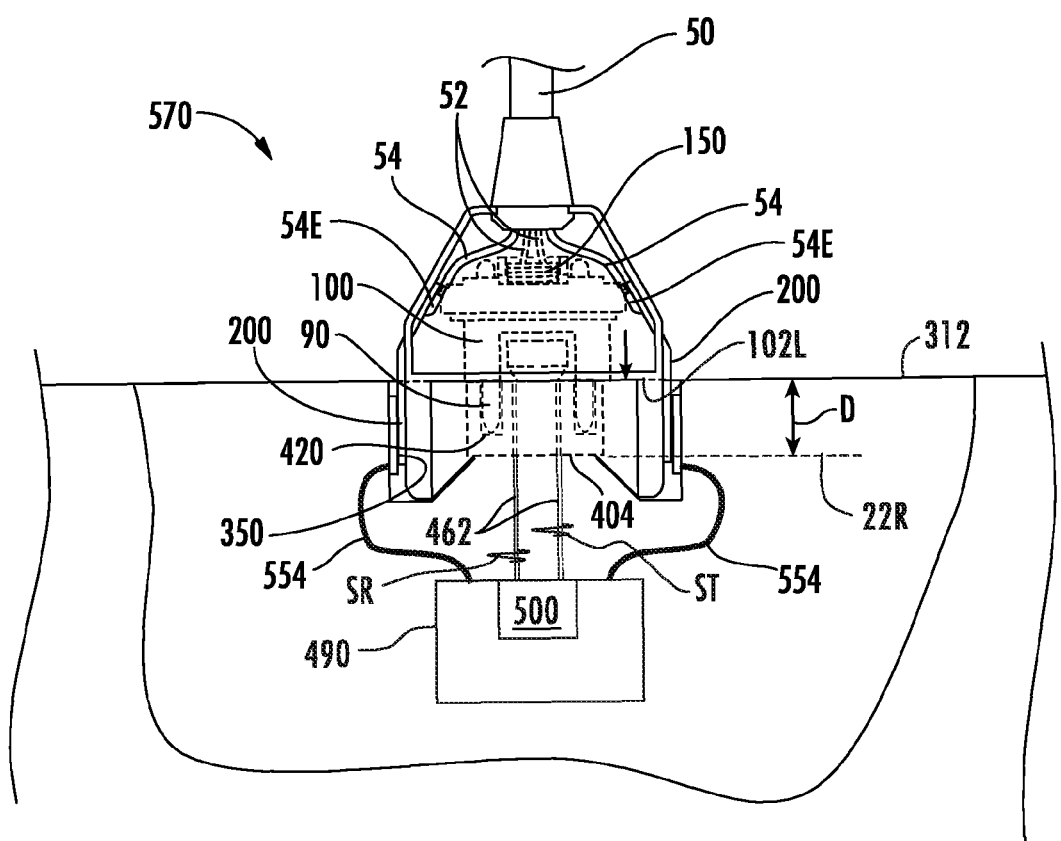
FIG. 7B is similar to FIG. 7A, but shows the plug matingly engaged with the receptacle of the electronic device.

FIG. 7B is similar to FIG. 7A but shows an example fiber optic interface assembly 570 constituted by plug 20 being matingly engaged with receptacle 320. As plug 20 engages receptacle 320, the front end 102 of plug ferrule 100 contacts the front end 402 of receptacle ferrule 400. However, since receptacle ferrule 400 is fixed in place (i.e., is not movable), it urges plug ferrule 100 axially towards the rear end 24 of plug housing 21 as the plug 20 is inserted into receptacle 320. Also, as plug 20 engages receptacle 320, prongs 38 of plug housing 21 are received by the complementary receptacle recess features 338, which serve to align plug 20 and receptacle 320, e.g., maintain their respective axes A1 and A2 as substantially coaxial. In addition, guide pins front ends 192 of plug ferrule 100 enter guide-pin holes 420 of receptacle ferrule 400.

When plug 20 and receptacle 320 are fully engaged, prongs 38 are fully engaged within receptacle recess features 338, guide pin front ends 192 are fully engaged with guide-pin holes, and the plug and ferrule front ends 102 and 402 are in contact, with waveguide bores 160 and 460 being substantially aligned with one another. In addition, plug ferrule 100 is in its rear-biased (i.e., retracted position) with resilient member 150 being in a compressed state. The distance D between the forward-biased position (as denoted by dashed line 22R representing recessed end 22R of plug housing 21) and the rear-biased position (as denoted by the dashed line 102L corresponding to ferrule front end 102) is shown in FIG. 7B.

In an example, the friction established by the mating engagement of plug 20 and receptacle 320 is sufficient to overcome the spring force of resilient member 150 pushing against plug ferrule 100, which force might otherwise act to push the plug out of the receptacle in the absence of a friction holding force.

Figure 8A:
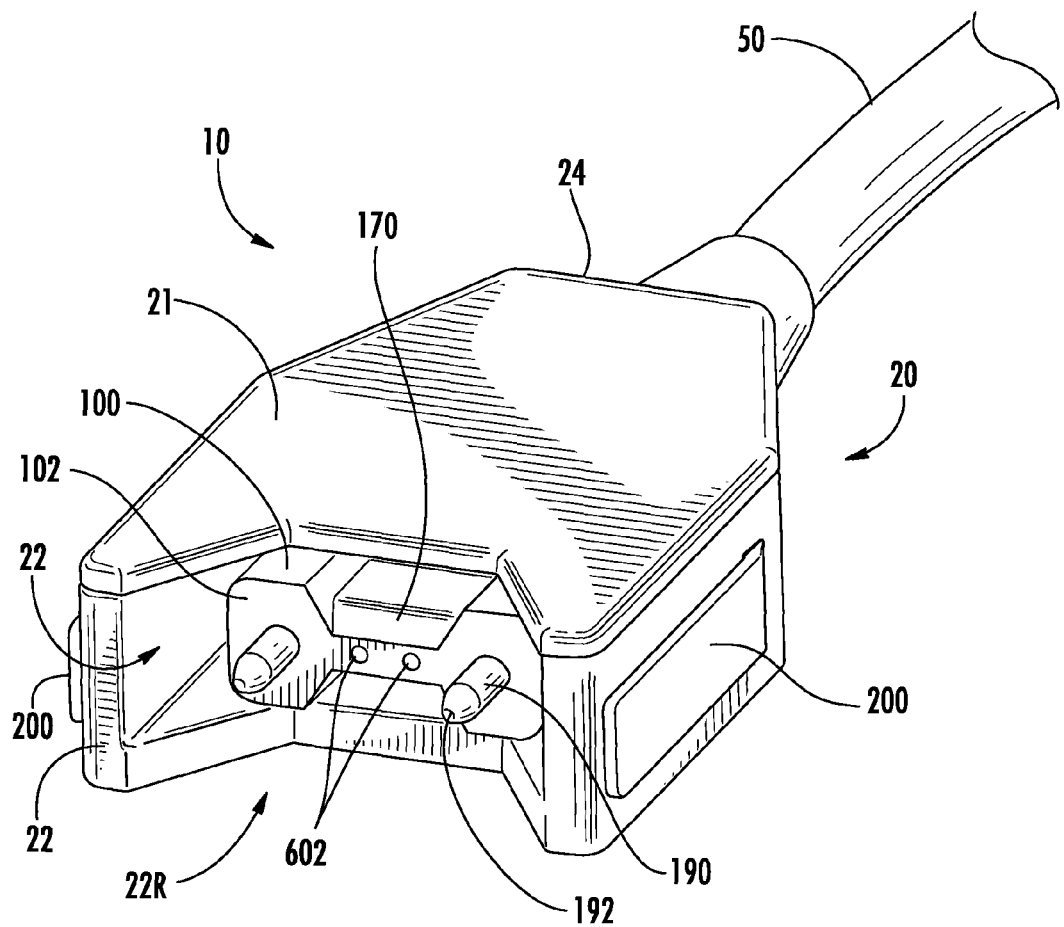
FIG. 8A is a front-elevated view similar to FIG. 2.
Figure 8B:
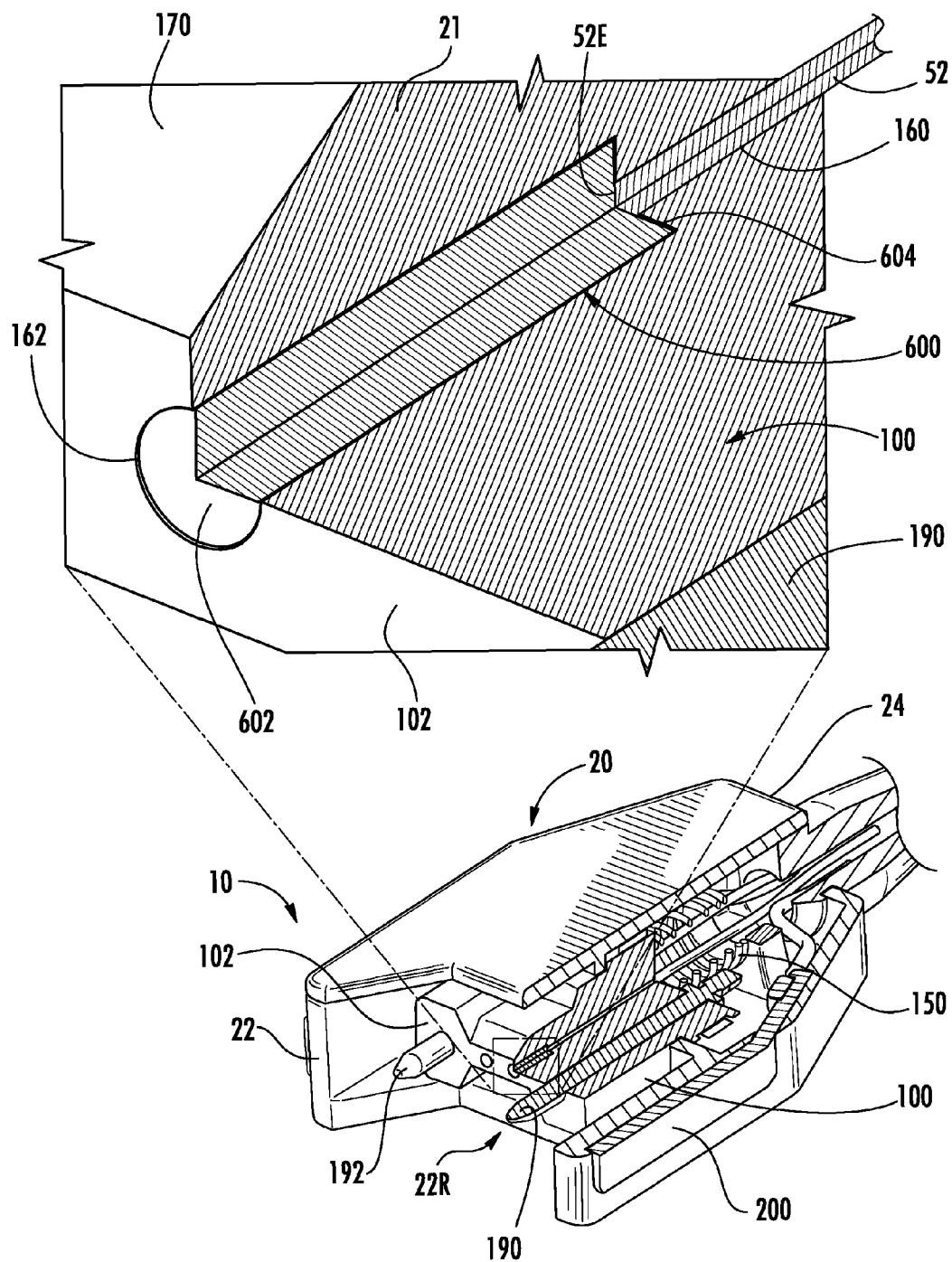
FIG. 8B is a partial cut-away view that illustrates an example embodiment of a fiber optic cable assembly having a plug that includes gradient-index (GRIN) lenses.

FIG. 8A is a front-elevated view similar to FIG. 2, and FIG. 8B is a partial cut-away view that illustrates an example embodiment of fiber optic cable assembly 10 having a plug 20 that includes gradient-index (GRIN) lenses 600. GRIN lenses 600 each have a front surface 602 and a rear surface 604. GRIN lenses 600 are arranged in waveguide bores 160 with GRIN lens front surfaces 602 at respective bore front ends 162 or slightly recessed therefrom (e.g., by up to about 100 microns). Optical fibers 52 are arranged in respective waveguide bores 160 such that each optical fiber end 52E is adjacent (e.g., is in contact with) the corresponding rear surface 604 of a GRIN lens 600.

Figure 9:
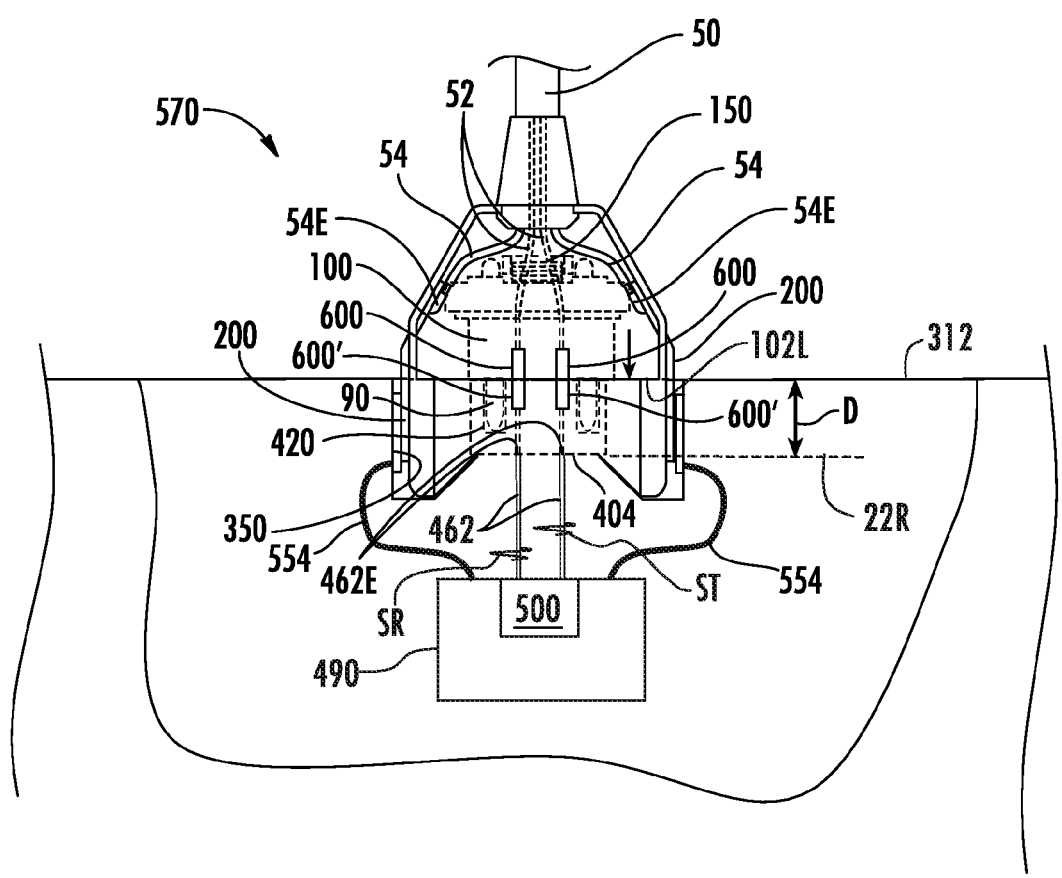
FIG. 9 is similar to FIG. 7B and illustrates an example embodiment of fiber optic interface assembly where the plug and receptacle include GRIN lenses.
Figure 10:
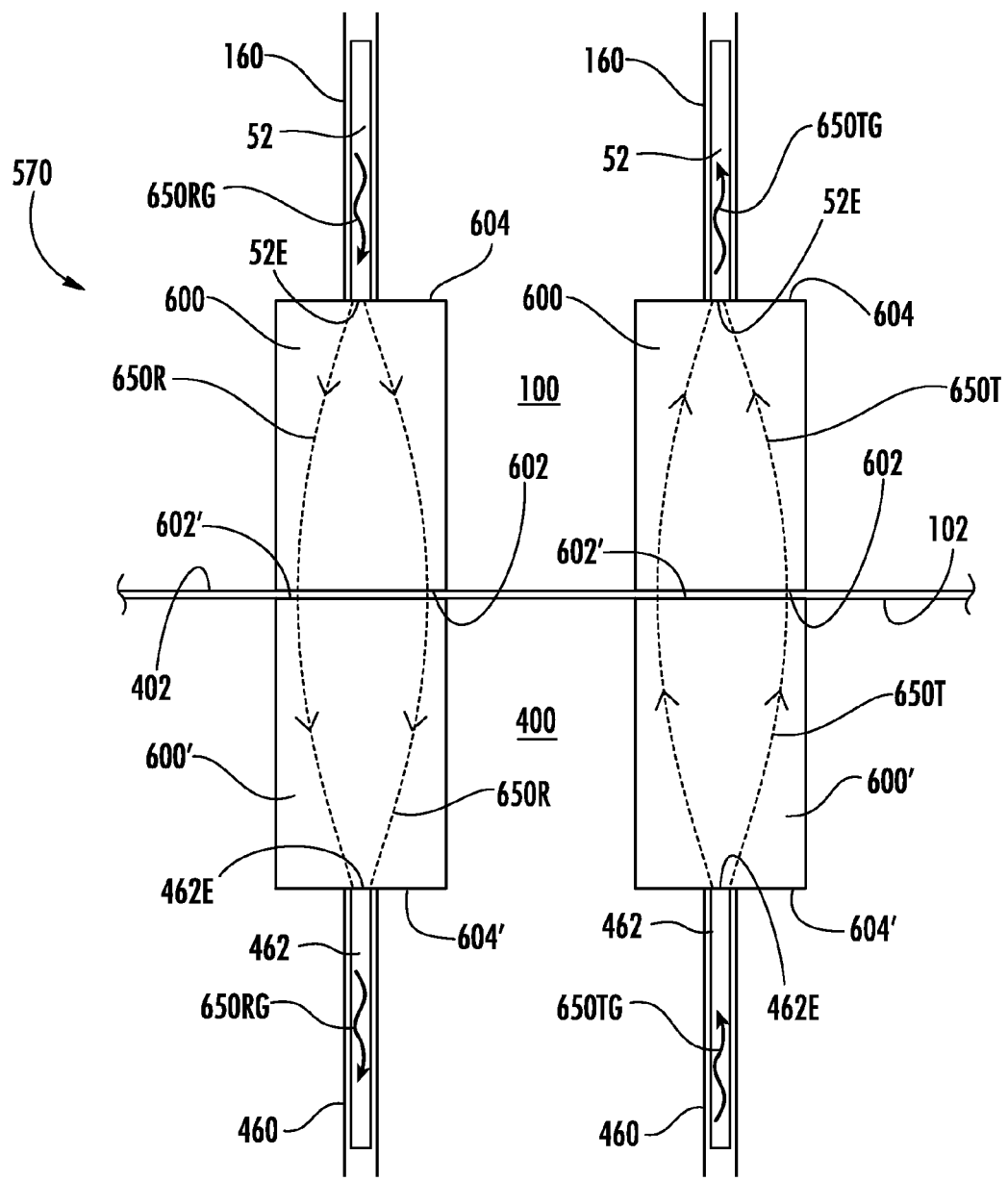
FIG. 10 is a close-up view of the interface between the plug and receptacle showing the interfaced GRIN lenses of the plug and receptacle.

FIG. 9 is similar to FIG. 7B and illustrates an example embodiment of fiber optic interface assembly 570 where plug 20 and receptacle 320 include respective GRIN lenses 600 and 600'. FIG. 10 is a close-up view of the interface of plug 20 and receptacle 320 showing the interfaced GRIN lenses 600 and 600'. Each GRIN lens 600' has a front surface 602' and a rear surface 604'. GRIN lenses 600' are supported by receptacle ferrule 400 in receptacle ferrule waveguide bores 460 so that GRIN lens front surfaces 602' coincide with receptacle ferrule front end 402, or are slightly set back therefrom (e.g., by up to about 100 microns). Receptacle optical waveguides 462 are arranged in receptacle ferrule waveguide bores 460 such that the receptacle optical waveguide ends 462E are arranged adjacent (e.g., in contact with) GRIN lens rear surfaces 604'.

In an example, two GRIN lenses 600 are included in plug 20 as transmit and receive GRIN lenses associated with transmit and receive plug optical fibers 52, and two GRIN lenses 600' are included in receptacle 320 as transmit and receive GRIN lenses associated with transmit and receive receptacle optical fibers 462.

Thus, transmit light 650T generated by integrated optical engine 500 by an optical transmitter therein (not shown) travels as guided transmit light 650TG in receptacle transmit optical waveguide 462 in the direction from receptacle 320 to plug 20. This guided transmit light exits optical waveguide end 462E and diverges as it enters GRIN lens 600' at rear face 604'. GRIN lens 600' acts to gradually bend the divergent transmit light 650T until it becomes substantially collimated at front surface 602'. This substantially collimated transmit light 650T enters front surface 602 of GRIN lens 600 of plug 20. GRIN lens 600 acts to gradually bend substantially collimated transmit light 660T until it becomes focused at near rear surface 604 and onto end 52E of plug transmit optical fiber 52. This focused transmit light 650T is coupled into plug transmit optical fiber 52 and becomes guided transmit light 650TG that travels through plug 20 and up through optical fiber cable 50.

Likewise, guided receive light 650RG traveling in plug receive optical fiber 52 and generated upstream of fiber optic cable 50 travels through the optical fiber cable 52 and ultimately to optical fiber end 52E, where it diverges into the corresponding GRIN lens 600 at rear surface 604 as divergent receive light 650R. GRIN lens 600 acts to gradually bend the divergent receive light 650R until it becomes substantially collimated at GRIN lens front surface 602. This substantially collimated receive light 650R exits GRIN lens front surface 602 and enters front surface 602' of GRIN lens 600' of receptacle 320. GRIN lens 600' acts to gradually bend substantially collimated receive light 650R until it becomes focused at or near GRIN lens rear surface 604' and thus focused onto the end 462E of receptacle receive optical fiber 462. This focused receive light 650R is coupled into receptacle receive optical fiber 462 and becomes guided receive light 650RG that travels through receptacle 320 and to an optical receiver (not shown) in integrated optical engine 500 (see FIG. 9).

It will be apparent to those skilled in the art that various modifications and variations can be made to the present disclosure without departing from the spirit and scope of the disclosure. Thus, it is intended that the present disclosure cover the modifications and variations of this disclosure provided they come within the scope of the appended claims and their equivalents.

What is claimed is:

1. A fiber optic interface device for connecting transmit and receive optical fibers having respective ends, comprising:
    a housing having a central axis, a front end, an exterior surface and an interior having a ferrule guide member disposed therein;
    a ferrule having a central axis, front and rear ends and configured to support the transmit and receive optical fibers and respective transmit and receive gradient-index (GRIN) lens elements having front and rear surfaces, with the transmit and receive optical fiber ends adjacent respective transmit and receive GRIN lens rear surfaces, with the transmit and receive GRIN lens front surfaces being at or adjacent the ferrule front end, the ferrule being moveably supported by the ferrule guide member with the ferrule axis being aligned with the housing central axis; and
    a resilient member disposed within the housing interior and configured to forward-bias the ferrule toward the housing front end when the fiber optic interface device is unmated;
    a receptacle being matingly engaged with the fiber optic interface device such that the ferrule is axially moved from the forward-bias position to a rear-bias position and comprising a distance D between the forward-bias position and the rear-bias position, wherein the distance D is in the range from 0.5 millimeters to 10 millimeters.

2. The fiber optic interface device of claim 1 for connecting first and second electrical wires of an optical fiber cable, the device further comprising:
    first and second electrical contacts disposed on the housing exterior surface, the first and second electrical contacts having respective rear portions that reside within the housing interior, said rear portions being respectively electrically contacted to the first and second electrical wires.

3. The fiber optic interface device according to claim 1, further comprising the housing front end having a recess that defines a recessed front end and first and second prongs on opposite sides of the recess.

4. The fiber optic interface assembly according to claim 3, further comprising the receptacle having recess features configured to engage the first and second prongs when the receptacle matingly engages the plug.

5. The fiber optic interface assembly according to claim 1, further comprising guide pins on the front end of the ferrule, and corresponding guide-pin holes sized to receive the guide pins when the receptacle matingly engages the plug.

6. The fiber optic interface assembly according to claim 1, wherein the receptacle includes transmit and receive GRIN lenses that are operably aligned with the transmit and receive GRIN lenses of the fiber optic interface device.

7. The fiber optic interface assembly according to claim 1, wherein the resilient member is a spring having an interior and the optical fibers travel from the fiber optic cable through the spring interior to the ferrule.

8. The fiber optic interface assembly according to claim 1, wherein the ferrule includes an angled portion adjacent the ferrule front surface.

* * * * *